Figure 1:
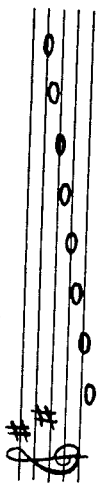

Jan. 24, 1956

C. LOUGHRIE 2,731,871

MEANS FOR TEACHING MUSIC

Filed Nov. 4, 1952

3 Sheets-Sheet 1

INVENTOR.
CARRIE LOUGHRIE
BY
Michael Williams
Attorney

Jan. 24, 1956

C. LOUGHRIE 2,731,871

MEANS FOR TEACHING MUSIC

Filed Nov. 4, 1952

3 Sheets-Sheet 2

INVENTOR.
CARRIE LOUGHRIE
BY
Michael Williams
Attorney

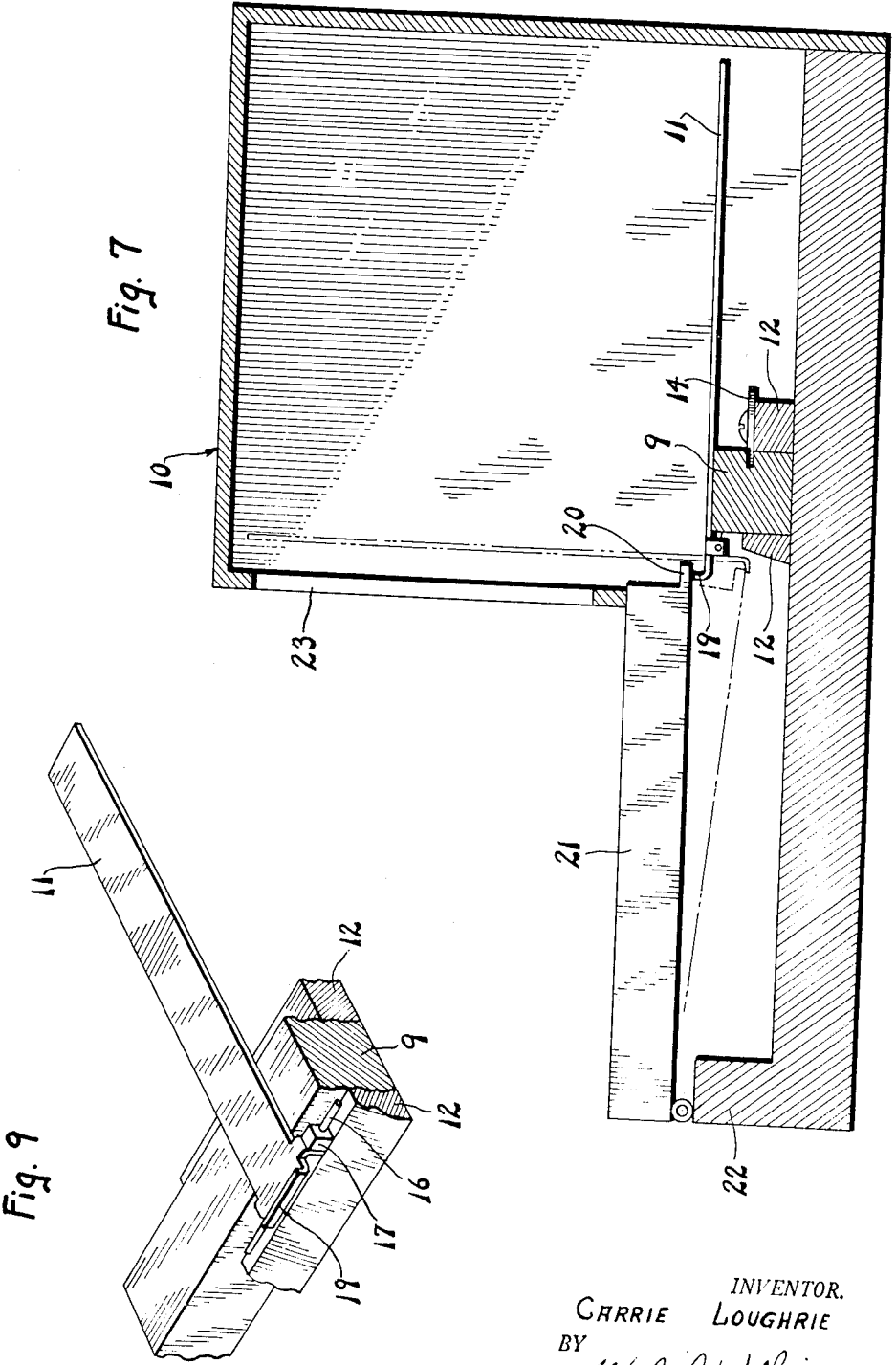

ered Jan. 24, 1956

2,731,871

MEANS FOR TEACHING MUSIC

Carrie Loughrie, Warren, Ohio

Application November 4, 1952, Serial No. 318,667

3 Claims. (Cl. 84—470)

My invention relates to methods of and means for teaching music, particularly to teaching of the elementals of music to students in the lower grade schools, and the principal object of my invention is to provide new and improved methods and apparatus for this purpose.

Most musically inclined students will in time learn the scales and will be able to repeat simple tunes, primarily by reason of repetition, but it has been found that visual education is playing a greater part in the present-day educational system and that students are not only learning the scales much easier by such education, but are also more readily trained in the reading of music so as to be able to identify and sing scales and simple tunes in various keys.

My invention provides apparatus which attracts the interest of the student and enables such student to visualize what is happening when the key of the music is changed and thereby is in better position to read music and identify the changing notes.

Figure 5:
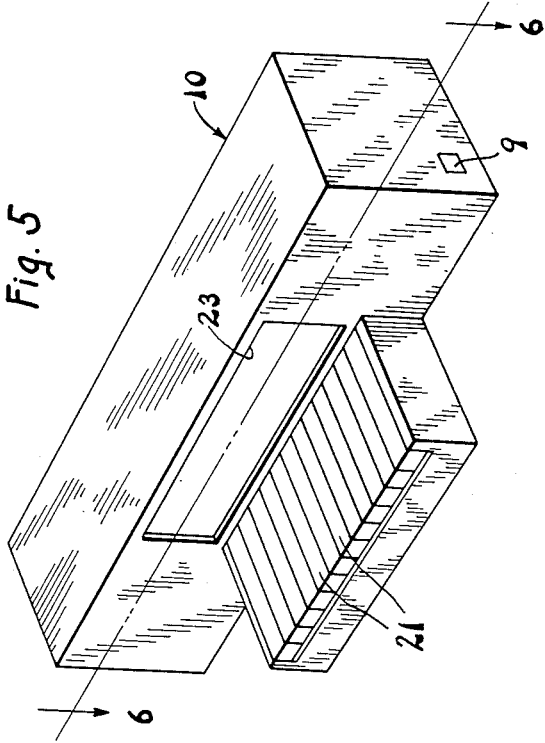
Figure 8:
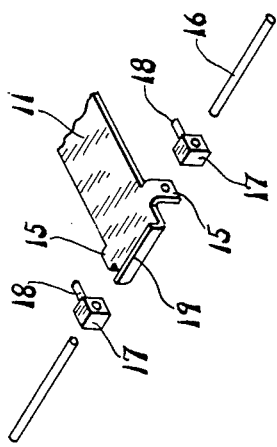
Figure 6:
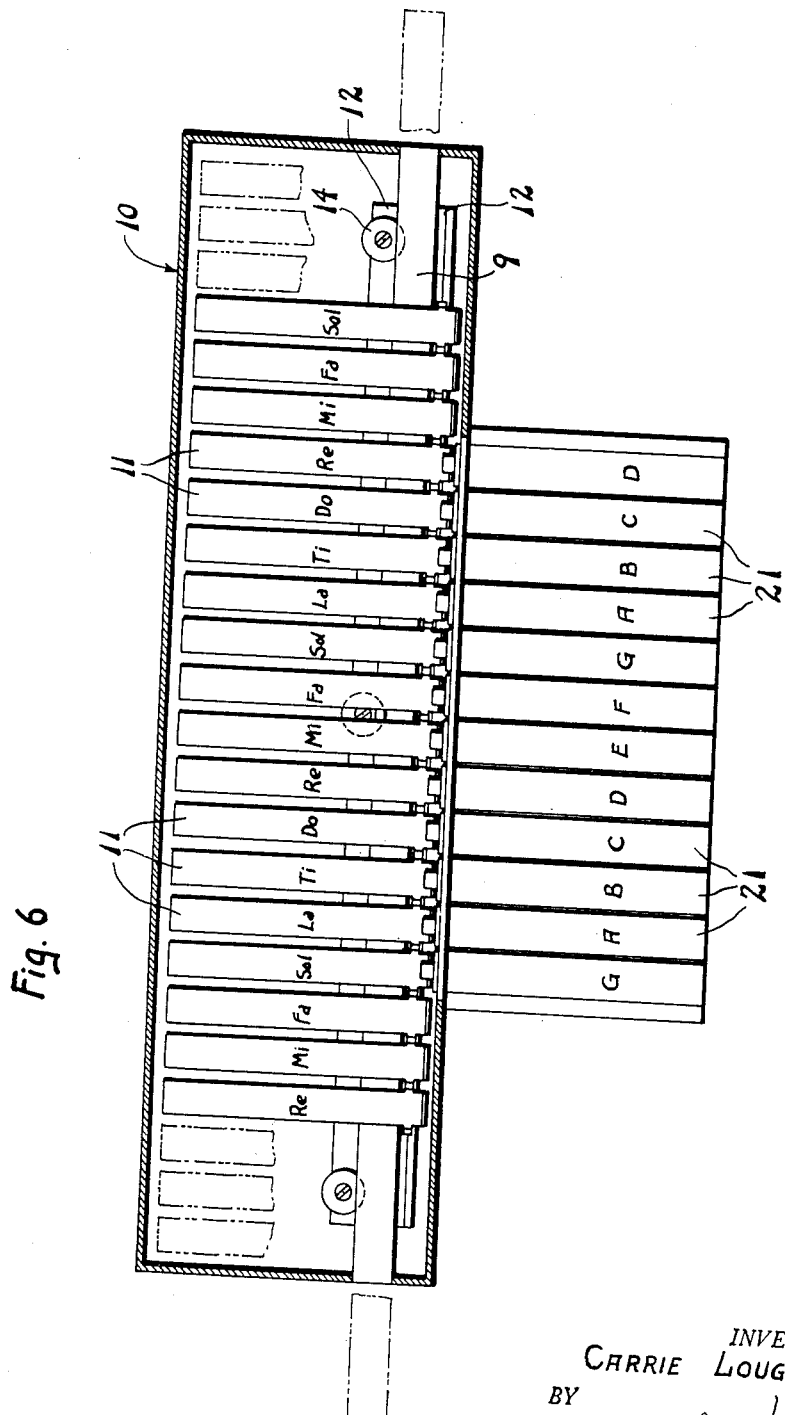

In the drawings accompanying the specification and forming a part of this application, there is shown, for purposes of illustration, an embodiment which my invention may assume, and in these drawings:

Figures 1 through 4 indicate known musical scales,

Figure 5 is a perspective view of apparatus disclosing an embodiment of my invention, Figure 6 is an enlarged sectional view corresponding generally to the line 6—6 of Figure 5, Figure 7 is an enlarged sectional view corresponding generally to the line 7—7 of Figure 6, Figure 8 is an exploded perspective view of details of the apparatus, and Figure 9 is a fragmentary perspective view showing the details of Figure 8 in assembled relation.

It is well known in the art of music that most of the simple music is made up of the tones of the seven-tone scale, thus "do," "re," "mi," "fa," "sol," "la," "ti," and "do" is then repeated. Five of these seven tones, however, can be altered, that is, raised or lowered, thus dividing a whole step between such tones into two sounds or tones.

An octave, as will be appreciated, is the tonal distance from one "do" to the next higher or lower "do" and therefore considering the possible five altered tones, it is evident that twelve tones exist within any given octave. In music, these twelve tones may be repeated higher or lower, and in various sequence, to give the impression of a great many different tones, and it is this variation of tones which provides the most trouble to a student.

As a matter of review, and for a better understanding of my invention, a tone has four characteristics, namely pitch, duration, dynamics and timbre. In this present embodiment, the invention is concerned primarily with pitch, although the other characteristics may also be taught through use of my invention.

As further review, music is written on staffs which comprise five equally spaced, parallel horizontal lines, and a clef is positioned, usually at the beginning of the staff to determine the pitch of a tone represented by a given note. The G clef is the most commonly used in simple music and is made around the second line of the staff, as shown in Figure 1.

The first seven letters of the alphabet (A—B—C—D—E—F—G) are used in music for naming the lines and spaces of the staff, and such letters may be consecutively repeated, as indicated in Figure 1. Thus, with the G clef, the letter names of the lines are E—G—B—D—F and the spaces are F—A—C—E.

The scales are often referred to as the major and minor scales and a scale can be constructed from each of the twelve pitches within the octave. In any one of such scale constructions, a new key (but not a new scale) results, according to the tone or note from which the scale starts. Thus, it will be evident that the scale is the same in every case, but is simply transposed higher or lower and my invention makes use of this fact.

Figure 2:
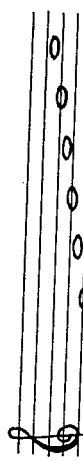
Figure 4:
Figure 3:
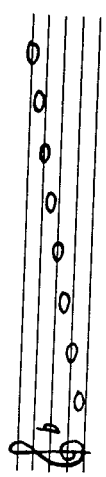

Thus, to write the major scale from different pitches means simply to transpose the scale into various keys. Accordingly, the scale from C would be written as shown in Figure 2, and C would be "do." To transpose the scale one step higher will bring the scale into the key of D, and the scale from D would be written as shown in Figure 3 and in this key D would be "do." In Figure 3 a key-signature of two sharps shows that C and F would have to be sharped, if it were played by an instrument, in order to properly produce the scale. Thus, it will be appreciated that the scale may be written from any pitch, and as further example, the scale from F is shown in Figure 4 wherein F is "do." The key signature of one flat indicates that B must be flatted, if it were played by an instrument, in order to properly produce the scale.

Primarily, my invention is helpful in teaching youngsters the elements of music and the embodiment of the invention herein disclosed comprises a case 10 of any suitable formation in which are pivotally mounted a plurality of members 11. As shown in Figure 6, the members 11 are preferably eighteen in number, starting with "re" and proceeding to "do" and then going through the scale to "do" and ending with "sol."

Each member 11 may take the form of some character or caricature which is representative of its note. Thus, "sol" may indicate a sun or any other form, "mi" may indicate a youngster pointing to himself and the other notes may be also suitably indicated so that when the youngster sees an individual member he is immediately reminded of the particular note of the scale. In addition, each member will also preferably carry its tonal representation such as "do," "re," etc.

Each member 11 is pivotally mounted on a slide 9 which is longitudinally movable along ways 12—12 carried by the base 13 of the casing 10. The slide 9 may be held from disassembly from the ways by means of removable washers 14 slidably fitting within a groove formed in the slide.

In the present embodiment, and referring particularly to Figures 8 and 9, each member 11, at its pivot portion, comprises a pair of ears 15—15, each apertured to pass a pivot rod 16 which is of a length to pass through the apertures in the ears of all the members 11. As seen in Figure 6, the members are disposed in predetermined spaced and aligned side-by-side relationship and in the disclosed embodiment spacer blocks 17 are provided to maintain the spaced relationship, each block being apertured to pass the pivot rod 16, and each block having a stub 18 fitting within a respective aperture in the slide 9 to locate the respective members.

A terminal end of each member 11 is, in this embodiment, formed with an upturned lip 19 adapted to cooperate with a ledge 20 (see especially Figure 7) formed on each of twelve keys 21 which may be similar to piano keys, although it will be appreciated that such similarity is not essential to my invention.

As herein shown, each key 21, at its end opposite its ledge 20, is pivotally mounted on a support 22 extending upwardly from a forward extension of the base of the case 10. Thus, as shown in Figure 7, a key 21, aligned with a respective member 11, may be depressed, as shown in dotted lines, by a finger of a user, and such depression causes the corresponding member 11 to move from horizontal position shown in full lines to upright position shown in dotted lines. Release of pressure on the key 21 will permit the parts to return to their full-line positions, and the relative disposition of the parts will provide for this although it will be appreciated that suitable spring means may be provided if desired or necessary.

Referring particularly to Figure 5, it will be noted that the present embodiment provides for an opening 23 in the forward wall of the case 10, such opening providing for view of twelve members 11 when they are in upright position. As shown in Figure 6, the slide 9 has been adjusted to align members 11 and keys 21 to represent the scale in the key of C. In this case, the key 21 labeled C is aligned with the member 11 representing "do," and the members 21 may be successively depressed, starting with the left-hand C key and proceeding to the right-hand C key to indicate the upward trend of the scale. Each time a key is depressed, the corresponding member 11 will be up-righted so that the student will see such corresponding member and associate it with the respective tonal note of the scale. If the instructor will sound the base note, such as the lower "do," either by a pitch horn, piano, or the like, the student will then be able to follow the scale as it is visually indicated by successive up-righting of the members 11.

When the key of the scale is changed, "do" will live (as it is referred to by many instructors of youngsters) on another note. For example, in the key of D, "do" will live on D and to effect this transposition the slide 9 is shifted so that the "do" member 11 will be aligned with the D key 21. This means that the scale will be started one tone higher and the instructor, by suitable sound, will indicate such higher tone in order that the student will be correctly started on the scale in the key of D. Any other scale in any suitable key may be effected by simply moving the slide 9 to align "do" with the proper key 21 relating to the scale key.

After the student has mastered the scales in the various keys, simple melodies may be taught by depressing the keys 21 in a selected manner so as to up-right the members 11 to correspond to the changing notes of the tune.

Likewise, strips of music, such as the scales shown in Figures 1 through 4, or simple tunes in the various keys, may be supported in view of the student, such as by a suitable stand affixed to or forming a part of the case 10, and the student, by practice, will become familiar with the various notes and scales by depressing the respective keys 21 in accordance with the notes designed on the music strip.

My invention, accordingly, not only teaches the fundamentals of music, but also is helpful in the instruction of the fundamentals of a musical instrument since the student will see on the music strip which note must be sharped or flatted (in certain keys) in order to properly produce the scale in that key.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. Apparatus for music instruction comprising a plurality of members each having indicia indicating a tonal note of the musical scale and said members being arranged in a row in side-by-side relation and in consecutive order of the tonal scale, each member being pivoted adjacent one end to provide a longer end on which is designated the note of the scale and a shorter end having a laterally off-set portion, said members being movable from normally horizontal position wherein said laterally off-set ends are generally up-right to an upright position to display the tonal indicia thereon, and a plurality of keys for cooperation with said members, each key being pivoted adjacent one end and having its free end overlying the laterally off-set portion of a corresponding member, whereby depression of the free end of a key causes swinging movement of its corresponding member to upright position, and removal of pressure from said key causes the parts to assume their normal position through weight of the larger end of the member.

2. A construction in accordance with claim 1 and additionally wherein said members and said keys are relatively shiftable along a line generally parallel to the line defined by the row of members, whereby said keys may be positioned to operate various ones of said members.

3. Apparatus for music instruction, comprising carriage means shiftable along a predetermined path, a plurality of consecutively arranged tone indicating members, each representing a tonal note of the musical scale and each pivotally connected to said carriage for individual movement transverse to the path along which said carriage shifts, all of said members being urged to one common pivoted position and each being selectively movable to another pivoted position, a casing having a wall extending generally parallel to the path of said carriage means for obstructing direct view of said members in said one pivoted position, said wall having an opening of a size to permit view of any one of a group including less than all of said members when any of said group is in said other pivoted position, the viewable group being changed by shifting said carriage means relative to said wall, and key members arranged exteriorly of said casing for manipulation by a user in the manner of a piano key-board, said key members being consecutively arranged and of a number corresponding to the number of tone indicating members in the group viewable through said wall opening, said key members having operating portions alignable with corresponding tone indicating members of any group viewable through said wall opening for pivotally moving a selected member to viewing position upon manual operation of a respective key member.

References Cited in the file of this patent

UNITED STATES PATENTS

| 355,261 | Fitch | Dec. 28, 1886 |
| 451,010 | Adamson | Apr. 28, 1891 |
| 1,175,226 | Blurton | Mar. 14, 1916 |
| 1,798,385 | Roth | Mar. 31, 1931 |
| 2,613,569 | Williams | Oct. 14, 1952 |